(12) United States Patent
Luthra et al.

(10) Patent No.: US 6,347,446 B1
(45) Date of Patent: Feb. 19, 2002

(54) METHOD OF MAKING SILICON CARBIDE-SILICON COMPOSITE HAVING IMPROVED OXIDATION RESISTANCE

(75) Inventors: Krishan Lal Luthra; Hongyu Wang, both of Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/324,550

(22) Filed: Jun. 3, 1999

Related U.S. Application Data

(62) Division of application No. 08/781,494, filed on Jan. 13, 1997, now Pat. No. 5,962,103.

(51) Int. Cl.$^7$ .................................................. B23P 6/00
(52) U.S. Cl. ....................... 29/402.18; 29/889.1; 29/530
(58) Field of Search .......................... 29/402.18, 889.1, 29/530; 428/107, 110, 285, 141, 336, 366, 408, 697, 698, 699, 704, 713

(56) References Cited

U.S. PATENT DOCUMENTS

| | | |
|---|---|---|
| 4,599,256 A | 7/1986 | Vasilos |
| 4,795,677 A | 1/1989 | Gray |
| 4,892,790 A | 1/1990 | Gray |
| 4,894,286 A | 1/1990 | Gray |
| 5,057,465 A * | 10/1991 | Sakamoto et al. ............. 501/90 |
| 5,094,901 A | 3/1992 | Gray |
| 5,707,471 A * | 1/1998 | Petrak et al. .................. 156/89 |
| 5,756,208 A * | 5/1998 | Haug et al. .................. 428/379 |
| 5,856,252 A * | 1/1999 | Lange et al. ................ 501/95.2 |
| 5,879,803 A * | 3/1999 | Masaki et al. .............. 428/378 |
| 5,962,103 A * | 10/1999 | Luthra et al. ................ 428/107 |
| 5,990,025 A * | 11/1999 | Suyama et al. ................ 501/92 |
| 6,013,592 A * | 1/2000 | Merrill et al. ................. 501/80 |
| 6,120,840 A * | 9/2000 | Paul et al. ................... 427/226 |
| 6,143,432 A * | 11/2000 | De Rochemont et al. ... 428/689 |
| 6,186,768 B1 * | 2/2001 | Schmitt ...................... 425/550 |
| 6,232,004 B1 * | 5/2001 | Lasater ....................... 428/702 |
| 6,235,379 B1 * | 5/2001 | Kameda et al. .......... 428/293.4 |
| 6,245,424 B1 * | 6/2001 | Lau et al. ................... 428/368 |

* cited by examiner

Primary Examiner—S. Thomas Hughes
Assistant Examiner—Essama Omgba
(74) Attorney, Agent, or Firm—Noreen C. Johnson; Christian G. Cabou

(57) ABSTRACT

A Silicon carbide-silicon matrix composite having improved oxidation resistance at high temperatures in dry or water-containing environments is provided. A method is given for sealing matrix cracks in situ in melt infiltrated silicon carbide-silicon matrix composites. The composite cracks are sealed by the addition of various additives, such as boron compounds, into the melt infiltrated silicon carbide-silicon matrix.

13 Claims, 6 Drawing Sheets

METHOD OF MAKING SILICON CARBIDE-SILICON COMPOSITE HAVING IMPROVED OXIDATION RESISTANCE

This application is a continuation division of application Ser. No. 08/781,494, filed Jan. 13, 1997 now U.S. Pat. 5,962,103 which is hereby incorporated by reference in its entirety.

The government may have certain rights to the invention under a government contract with the National Aeronautic and Space Administration (NASA), contract number NAS3-26385.

FIELD OF THE INVENTION

This invention is related to a fiber reinforced silicon-silicon carbide matrix composite. More particularly, the invention is related to a silicon-silicon carbide matrix that is dispersed with glass forming elements that seal cracks in situ in the composite in a high temperature water-containing environment. The invention is also related to a molten silicon infiltration method of making the composite and articles made from the composite material.

BACKGROUND OF THE INVENTION

Structural materials today need to operate at higher temperatures. Most ceramic materials have good long-term stability against creep and chemical attack at temperatures above the operating range for current alloys. Because of ceramic's low fracture energies, however, ceramics are subject to catastrophic failure. Even relatively small defects can start propagation of cracks that can catastrophically propagate through the ceramic component. Therefore, measures for improving their fracture toughness, i.e., toughening ceramics without sacrificing their excellent properties, are sought after.

Fiber-reinforced ceramic composites are being considered as the next generation of high temperature structural materials for advanced aircraft engines and gas turbines. They possess higher temperature capability and lighter weight than those of the currently used superalloys. In these potential applications, fiber-reinforced ceramic composites are subjected to severe thermal and mechanical conditions. Although the fiber-reinforced composites are designed to be used below their matrix cracking stress, accidental overstressing, either thermally as a result of a thermal shock or mechanically during a foreign object impact, can hardly be avoided.

Cracks will be generated in the fiber-reinforced composite matrix when the composite is subjected to a higher stress than its matrix cracking stress. Such cracks will stay open even if the operating stress is subsequently reduced to a value below the matrix cracking stress, exposing coatings and/or fibers to the environment. As a result, the existence of cracks in fiber-reinforced composite matrices will affect the performance and durability of the composites, especially if the cracks are through the thickness of the composites.

These cracks can serve as a fast path for the transport of environmental gaseous phases into the composite. Oxygen can diffuse very rapidly through even extremely small cracks in the matrix. The fibers and any coating that may be on the fiber can oxidize by oxygen diffusing through the crack. Oxygen reacts with the fiber coating and eventually the fiber, causing local bonding between the fiber and matrix. Fiber failure will initiate at this bonded location because of the resultant stress concentration and fiber degradation. This process continues until the remaining fibers are unable to carry the load, and the composite fails at a stress appreciably less than the ultimate strength. The composite also loses its tough behavior because of the strong bonding between the fiber and the matrix. Thus, a serious problem limiting the life of ceramic composites is the oxidation of the fiber coating followed by oxidation of the fiber at the base of the crack.

The ceramic composites of interest for engine applications have focused on carbon-carbon composites, having a carbon matrix with carbon fibers, and silicon carbide composites, which have a silicon carbide matrix with silicon carbide fibers, the fibers usually being coated. An important limitation to the use of carbonized structural materials is their susceptibility to oxidation in high temperature, oxidizing environments. Oxygen attacks the surface of the carbonized material and seeps into the pores of interstices that invariably are present, oxidizing the surfaces of the pores and continuously weakening the material. The oxidizing atmosphere reaching the fibers, carbon and graphite fibers, seriously degrades the composite structure.

An approach to overcome the oxidation of carbon-carbon composites has been the use of glass-formers as oxidation inhibitors. The glass-formers are used as coatings surrounding the carbon matrix, and/or placed between carbon fiber plies. The patents that teach the use of glass-formers as oxidation inhibitors in carbon-carbon composites are U.S. Pat. No. 4,795,677; U.S. Pat. No. 4,894,286; U.S. Pat. No. 4,892,790; and U.S. Pat. No. 4,599,256.

In spite of the advances that have been made in carbon-carbon composites, there is still a demand for improved ceramic composites with higher temperature and mechanical capability. Silicon carbide and silicon carbide-silicon matrix composites are currently of interest. These composites can be made by various methods. One method of making silicon carbide composites is the use of chemical vapor infiltration. Here, layers of cloth made of the fiber material are coated with boron nitride by chemical vapor infiltration. This takes about one day to deposit about 0.5 micrometers of boron nitride. The layers of cloth are then coated with silicon carbide by chemical vapor deposition for about 10 to 20 days. An approach to overcome the oxidation of silicon carbide composites has been the use of an oxygen-scavenging sealant-forming region in intimate contact with the ceramic fibers and a debonding layer, which is in intimate contact with the ceramic fibers, as described in U.S. Pat. No. 5,094,901.

A method of making silicon carbide-silicon matrix composites reinforced with silicon carbide-containing fibers is by using molten silicon melt infiltration into a preform. In this process, silicon carbide fibers are bundled in tows and coated with a coating or combination of coatings selected from the group consisting of boron nitride, pyrolyzed carbon, silicon nitride, carbon, and mixtures thereof. 35 In one version of silicon carbide-silicon composites, the coatings comprise layers of boron nitride and silicon carbide or silicon nitride. The tows are laminated to make a structure, which is then infiltrated with molten silicon. In these methods a boron nitride coating on the fiber is used to protect the fiber from attack by molten silicon or for debonding. Another method used to make silicon carbide-silicon composites uses fibers in the form of cloth or 3-D structure, which are layered into the desired shape. Boron nitride coating is deposited on the cloth layers by chemical vapor infiltration as mentioned above, and silicon carbide coating is deposited also by chemical vapor infiltration for about 5 days to achieve a thickness of about 2 micrometers. The structure is then processed in a slurry and melt infiltrated with molten silicon. The molten silicon may contain minute amounts of boron.

Recently, reinforcing silicon carbide-silicon matrix composites with strong silicon carbide fibers have been shown to increase their fracture energy substantially and exhibit tough failure mode. The increased fracture toughness of silicon-silicon carbide matrix composites, combined with their high creep resistance and chemical stability at high temperatures, make them promising materials for use as structural components in hot sections of heat engines and gas turbines.

When silicon carbide-silicon matrix composites develop fine cracks as a result of loading beyond the first matrix cracking stress, the silicon carbide fiber as well as the crack surface is exposed to oxidative environments. This can occur in dry oxidative environments as well as wet or water vapor-containing environments, such as encountered under humid conditions in combustion engines where there are combustion gaseous products of fuels. The oxidative attack is rapid at high temperatures. The oxidation of the crack surface and the fiber may make the composite brittle. The result may be a weaker composite and premature failure of a component part made from the silicon carbide-silicon composite.

Thus, there is a need for a ceramic composite that successfully seals cracks in silicon carbide-silicon matrix composites to prevent the ready access of oxygen at high temperatures, above about 600° C. There is also a need for a method to make silicon carbide-silicon matrix composites and articles made from molten silicon infiltration that heal matrix cracks in dry and water vapor-containing environments at high temperatures, greater than about 600° C.

SUMMARY OF THE INVENTION

These needs are satisfied by the development of fiber reinforced silicon carbide-silicon matrix composite having improved oxidation resistance at high temperatures in dry or water-containing environments. The invention provides a method for sealing matrix cracks in situ in silicon carbide-silicon matrix composites. The composite cracks are sealed by the addition of various additives, such as boron compounds, into the silicon carbide-silicon matrix. A crucial factor to successfully seal cracks is the atomic ratio of atom to silicon atoms in the matrix. The matrix boron additives oxidize once they are exposed on crack surfaces. These oxidation products help seal the crack before damage to the underlying fiber and its coating takes place. The benefit is the preservation of the composite properties when the silicon carbide-silicon matrix composite is subjected to higher stresses than the matrix cracking stress.

Briefly then, one aspect of the invention is a method for in situ sealing of cracks in silicon carbide-silicon matrix composites reinforced with coated fibers, comprising the steps of: selecting a preform having fibrous material and an admixture comprising particles selected from the group consisting of carbon particles, silicon carbide particles, and mixtures thereof, and a boron compound selected from the group consisting of boron carbide ($B_4C$), titanium borides (such as $TiB_2$), zirconium borides (such as $ZrB_2$), aluminum borides (such as $AlB_2$ and $AlB_{12}$), calcium borides (such as $CaB_6$), boron silicides (such as $SiB_6$), and mixtures thereof; infiltrating at least molten silicon into said preform to form a silicon carbide-silicon matrix composite having boron compounds dispersed in said matrix, where said boron compounds subsequently oxidize at a crack surface to provide a glass sealant in said crack.

In another aspect of the invention, there is provided a ceramic composite capable of self-healing cracks, comprising coated fibers in a silicon carbide-silicon matrix containing boron selected from the group consisting of boron carbide, titanium boride, zirconium boride, aluminum borides, calcium boride, boron suicides, and mixtures thereof. A preferred boron-containing compound is $B_4C$. It is believed that the $B_4C$ partially dissolves into the silicon melt and becomes more uniformly distributed in a finer scale throughout the matrix.

Yet another aspect of the invention includes an article of manufacture for use in an engine, said article made of a ceramic composite having an elemental silicon phase containing dissolved boron, a silicon carbide phase, fibrous material, and boron-containing compounds dispersed throughout the composite, where said boron-containing material is selected from the group consisting of boron carbide, titanium boride, zirconium boride, aluminum borides, calcium boride, boron silicides, and mixtures thereof.

One object of the invention is to provide a ceramic composite with increased oxidation resistance. The oxidation resistance is increased in a fiber reinforced silicon-silicon carbide matrix composite in the presence of matrix cracks. Another object of the invention is to seal the cracks in the composite matrix in situ with rapidly forming oxidation products on the crack surfaces, so as to block the path for further oxygen diffusion. Still another object of the invention is to provide a method to seal cracks in water vapor-containing environments, e.g., in engine applications.

Those skilled in the art will gain a further and better understanding of the present invention from the detailed description set forth below, considered in conjunction with the figures accompanying and forming a part of the specification.

DESCRIPTION OF THE INVENTION

Figure 1A:
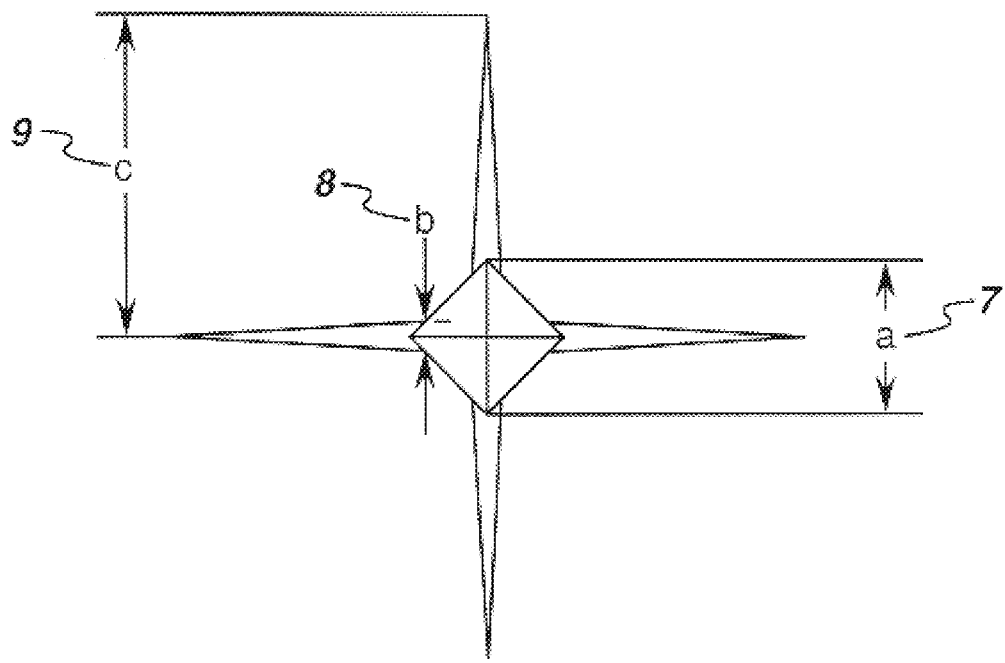
FIG. 1 is a schematic showing the top view (1a) and cross-section (1b) of a Vickers indentation to simulate matrix cracks in the composites.

Silicon carbide-based composites, such as fibrous silicon carbide-silicon matrix composites, that are processed by silicon melt infiltration, and that have the capability of sealing matrix cracks in water-containing oxidizing high temperature environments, are provided by this invention. The present invention produces a ceramic composite with a porosity of less than about 20% by volume, with the capacity to heal matrix cracks in situ in a silicon carbide-silicon composite matrix, comprising a fibrous material of which the fibrous material component comprises at least about 5% by volume of the composite; and a composite matrix having at least about 1% by volume of a phase of elemental silicon comprising substantially silicon; and boron dispersed throughout the matrix where an atomic ratio of boron to silicon atoms in the composite matrix is between about 0.05 to about 0.40, and the boron is present in the form of elemental boron or at least one boron-containing compound. The elemental silicon phase comprises substantially silicon, but may have other dissolved elements, such as boron. It has further been discovered that matrix cracks seal in situ in high temperature, wet or dry environments.

Another embodiment of the invention is provided by a method of making a silicon-silicon carbide composite capable of healing cracks in situ in the composite matrix, comprising the steps of: depositing at least a first coating on a silicon carbide-containing fibrous material which substantially covers an outer surface of said fibrous material; admixing a particulate material selected from the group consisting of carbon, silicon carbide, and mixtures thereof, and at least one boron-containing material with said fibrous material; forming said admixture into a preform; infiltrating said preform with an infiltrant comprising substantially molten silicon; and cooling said infiltrated preform to produce the silicon-silicon carbide matrix composite, where a ratio of boron atoms to silicon atoms in said matrix is between about 0.05 to about 0.40.

As used herein, "carbon" includes all forms of elemental carbon including graphite, particles, flakes, whiskers, or fibers of amorphous, single crystal, or polycrystalline carbon, carbonized plant fibers, lamp black, finely divided coal, charcoal, and carbonized polymer fibers or felt such as rayon, polyacrylonitrile, and polyacetylene. "Fibrous material" includes fibers, filaments, strands, bundles, whiskers, cloth, felt, and a combination thereof. The fibers may be continuous or discontinuous. Reference to silicon carbide-containing fiber or fibrous material includes presently available materials where silicon carbide envelops a core or substrate, or where silicon carbide is a core or substrate. Other core materials which may be enveloped by silicon carbide include carbon and tungsten. The fibrous material can be amorphous, crystalline, or a mixture thereof. The crystalline material may be single crystal or polycrystalline. Examples of silicon carbide-containing fibrous materials are silicon carbide, Si—C—O, Si—C—O—N, Si—C—O-Metal, and Si—C—O-Metal where the Metal component can vary but frequently is titanium or zirconium. There are processes known in the art which use organic precursors to produce silicon carbide-containing fibers which may introduce a wide variety of elements into the fibers.

In carrying out the present process, a coating system is deposited on the fibrous material which leaves at least no significant portion of the fibrous material exposed, and preferably, the entire material is coated. The coating system may contain one coating or a series of coatings. The coating should be continuous, free of any significant porosity and preferably it is pore-free and significantly uniform. Examples of coating systems are boron nitride and silicon carbide; boron nitride, silicon nitride; boron nitride, pyrolyzed carbon, silicon nitride, etc. Examples of further coatings on the fibrous material that are contemplated for this invention are nitrides, borides, carbides, oxides, silicides, or other similar ceramic refractory material. Representative of ceramic carbide coatings are carbides of boron, chromium, hafnium, niobium, silicon, tantalum, titanium, vanadium, zirconium, and mixtures thereof. Representative of the ceramic nitrides useful in the present process is the nitride of hafnium, niobium, silicon, tantalum, titanium, vanadium, zirconium, and mixtures thereof. Examples of ceramic borides are the borides of hafnium, niobium, tantalum, titanium, vanadium, zirconium, and mixtures thereof. Examples of oxide coatings are oxides of aluminum, yttrium, titanium, zirconium, beryllium, silicon, and the rare earths. The thickness of the coatings may range between about 0.3 to 5 micrometers.

The fibrous material may have more than one coating. An additional protective coating should be wettable with silicon and be about 500 Angstroms to about 3 micrometers. Representative of useful silicon-wettable materials is elemental carbon, metal carbide, a metal coating which later reacts with molten silicon to form a silicide, a metal nitride such as silicon nitride, and a metal silicide. Elemental carbon is preferred and is usually deposited on the underlying coating in the form of pyrolytic carbon. Generally, the metal carbide is a carbide of silicon, tantalum, titanium, or tungsten. Generally, the metal silicide is a silicide of chromium, molybdenum, tantalum, titanium, tungsten, and zirconium. The metal which later reacts with molten silicon to form a silicide must have a melting point higher than the melting point of silicon and preferably higher than about 1450° C. Usually, the metal and silicide thereof are solid in the present process. Representative of such metals is chromium, molybdenum, tantalum, titanium, and tungsten.

Known techniques can be used to deposit the coatings which generally is deposited by chemical vapor deposition using low pressure techniques.

As stated above, the coated fibrous material is admixed with at least a carbon or silicon carbide or mixture of carbon and silicon carbide material and boron or at least one boron-containing compound. Other elements or compounds may be added to the admixture to give different composite properties or structure. The particular composition of the admixture is determinable empirically and depends largely on the particular composition desired, i.e., the particular properties desired in the composite. However, the admixture always contains sufficient elemental carbon, or silicon carbide, or mixtures of carbon and silicon carbide, to enable the production of the present silicon-silicon carbide composite. Specifically, the preform should contain sufficient elemental carbon or silicon carbide or mixtures of carbon and silicon carbide, generally most or all of which may be provided by the admixture and some of which may be provided as a sacrificial coating on the fibrous material, to react with the molten silicon infiltrant to produce the present composite, containing silicon carbide, silicon, and the boron-containing silicon carbide. Generally, elemental carbon ranges from about 5% by volume, or from about 10% or 20% by volume, to almost about 100% by volume of the admixture.

The boron-containing compound in the admixture in the preform is present in a sufficient amount to have an atom ratio of boron to silicon in the silicon-silicon carbide matrix of between about 0.05 to 0.40. The preferred range is about 0.10 to 0.25, and the most preferred range is about 0.11 to 0.19. It has been discovered that this range of boron to silicon atoms present in the composite matrix will seal the cracks about 1 micrometer wide in about four to twenty-four hours in a water vapor-containing environment. At four hours an atomic ratio of boron to silicon was about 0.19. The cracks sealed completely in twenty-four hours with an atomic ratio of boron to silicon of about 0.11. The cracks sealed with these ratios of boron to silicon are about 1 micrometer wide, or 1.1 micrometers wide. Wider cracks may be sealed if the atomic ration of boron to silicon is adjusted, as well as the time and temperature.

Preferred boron-containing compounds are carbides and silicides. A most preferred compound is boron carbide, which is admixed with carbon or silicon carbide or mixtures of carbon and silicon carbide in the preform prior to the step of molten silicon infiltration. Specific examples of boron-containing compounds are boron carbide, titanium borides, zirconium borides, aluminum borides, calcium borides, boron silicides, and mixtures thereof.

The mixture of carbon or silicon carbide or carbon and silicon carbide and at least one boron-containing compound in the preform can be in the form of a powder and may have an average particle size of less than about 50 microns, more preferably less than about 10 microns. The molten silicon that infiltrates the preform is comprised substantially of silicon, but may also contain elemental boron, which has limited solubility in the molten silicon. The silicon infiltrant may also contain boron-containing compounds or other elements or compounds.

The admixture in the preform containing the carbon or silicon carbide or mixture of silicon carbide and carbon, and boron-containing compound is wetted by the molten silicon infiltrant. In carrying out the present process, the preform is contacted with the silicon infiltrant by an infiltrating means. The infiltrating means allow the molten silicon infiltrant to be infiltrated into the preform. U.S. Pat. No. 4,737,328, incorporated herein by reference, discloses an infiltration technique. In the present process, sufficient molten silicon infiltrant is infiltrated into the preform to produce the present composite. Specifically, the molten silicon infiltrant is mobile and highly reactive with any carbon present in the preform to form silicon carbide. Pockets of a silicon phase also form in the matrix. The boron-containing compounds in the preform are incorporated into the silicon-silicon carbide matrix during the matrix formation in the molten silicon infiltration step.

The period of time required for infiltration is determinable empirically and depends largely on the size of the preform and extent of infiltration required. Generally, it is complete in less than about 60 minutes, and often in less than about 10 minutes. The resulting infiltrated body is cooled in an atmosphere and at a rate which has no significant deleterious effect on it.

The present composite then is comprised of coated fibrous material and a matrix phase. The matrix phase is distributed through the coated fibrous material and generally it is substantially space filling and usually it is interconnecting. Generally, the coated fibrous material is totally enveloped by the matrix phase. The matrix phase contains a phase mixture of silicon carbide and silicon. The boron-containing compounds are dispersed throughout the matrix. The fibrous material comprises at least about 5% by volume, or at least about 10% by volume of the composite. The matrix contains a silicon carbide phase in an amount of about 5% to 95% by volume, or about 10% to 80% by volume, or about 30% to 60% by volume, or about 45% to 55% by volume, of the composite. The matrix may contain an elemental silicon phase in an amount of about 1% to 30% by volume of the composite. Boron is present in the matrix in an amount measured by the atomic ratio between boron and silicon. This can be about 0.05 to 0.40, preferred about 0.10 to 0.25, and most preferred about 0.11 to 0.19.

The following examples further serve to demonstrate, but not limit, the invention.

EXAMPLES

TABLE 1 shows the experimental conditions used in the examples to demonstrate crack-sealing in silicon-silicon carbide composites. The 90% water content in the atmosphere ($P_{H_2O}$=0.9 atm) represents an upper limit for the water vapor pressure in engine combustor operating conditions. Four different high temperatures were used: 600° C., 700° C., 800° C., and 900° C. and at three different times, the effects of crack-sealing were looked at (40 minutes, 4 hours, and 24 hours).

TABLE 1

| Experimental Conditions for Crack-Sealing Study | |
|---|---|
| Temperature | 600°, 700°, 800°, and 900° C. |
| Atmosphere | Dry $O_2$ and 90% $H_2O$ + 10% $O_2$ |
| Time | 40 min, 4 hr, 24 hr |

The boron-containing compounds used in the examples for sealing matrix cracks are summarized in TABLE 2. In the cases that the boron-containing compounds were coarse in size, efforts were made to extract fine particles from the raw supplies by centrifugal sedimentation.

TABLE 2

| | Boron-containing Materials Used in Crack-Sealing Study | | |
|---|---|---|---|
| Material | Density (g/cm$^3$) | Particle Size | B Content (wt %) |
| SiC | 3.21 | <1 µm | 0 |
| $B_4C$ | 2.52 | <5 µm | .76 |
| $TiB_2$ | 4.52 | 99% <6 µm | >28.5 |
| $ZrB_2$ | 6.09 | 99% <10 µm | >18.7 |
| $SiB_6$ | 2.43 | −200 mesh | ~68 |
| $CaB_6$ | 2.46 | −20 mesh | >55 |
| $AlB_2$ | 3.16 | 2–5 µm | >44 |
| $AlB_{12}$ | 2.58 | 3 µm | ~83 |

For sintered samples, preparation of the composites were done as follows. Silicon carbide and various boron additives were mixed with 3 weight % Carbowax™ as a binder, and Novolac™ in methanol solution (10%) to supply 0.5 weight % free carbon for the sintering. For titanium boride, zirconium boride, and calcium boride additives, 0.5 weight % of elemental boron was also added as a densification aid. Different boron/silicon atomic ratios were obtained by varying the amount of the additives. The mixtures were ball milled for 6 hours in isopropanol with zircon media. The slurries were then oven-dried and sieved through a 40 mesh screen. Powder compacts were prepared by cold uniaxial and cold isostatic pressing before densification. Pressureless sintering was performed on SiC—$B_4C$ samples in a graphite furnace under flowing argon at 2100° C. for 20 minutes. Hot pressing was performed on samples with all other boride additives in an induction heated furnace under flowing $N_2$ at 2000° C. and 60.7 MPa for 30 minutes.

Densification of the silicon carbide and additive mixtures to form the composite was achieved by pressureless sintering, hot pressing, and melt infiltration. Silicon melt infiltration was part of the method of making the inventive composite. In contrast, the sintering and hot pressing methods were used to demonstrate the boron-containing compound effects on crack sealing in composites made by sintering or hot pressing or chemical vapor infiltration, processes in which no elemental silicon phase is present.

Silicon melt infiltration was employed for the silicon carbide/boron carbide and silicon carbide/titanium boride mixtures.

Figure 1B:
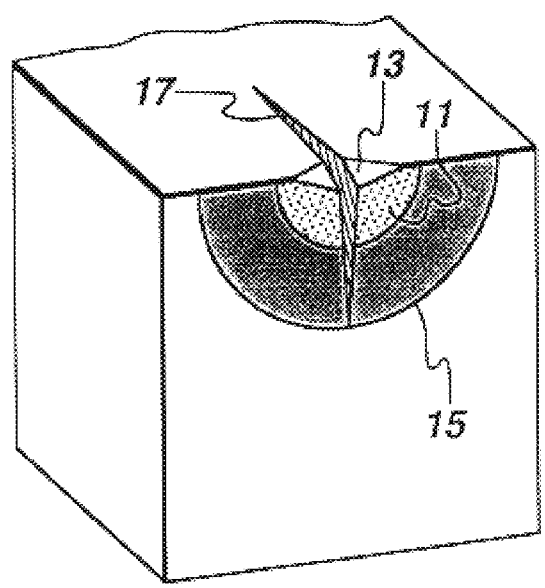
Figure 2A:
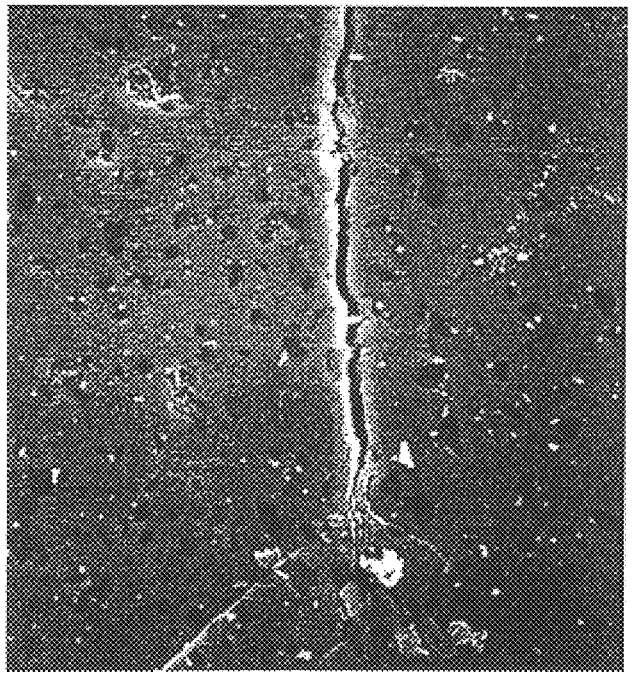
FIG. 2 is scanning electron micrographs of the surface of a SiC—$B_4C$ sample after indentation at magnifications of 2,000 and 10,000, respectively.
Figure 2B:

Pure silicon was used as the infiltrant. Powder mixtures were cold uniaxially pressed at 53 MPa into preforms of about 60% density. The preforms were placed in a boron nitride coated graphite boat and buried in a pile of silicon powder. The infiltration was carried out in a graphite resistance furnace under vacuum at 1425° C. for 30 minutes. After densification, the samples were cut into cubes with about 3 millimeters in each dimension, and one side of the sample was polished to 3 micrometer finish with diamond pastes. Indentation cracks were introduced on the polished surfaces. Vickers indentation was used to introduce orthogonal cracks in the composites as illustrated in FIG. 1a and 1b. FIG. 1a shows the diagonal length of the indent 7, the maximum crack opening 8, and the crack length 9. In FIG. 1b it is shown that the cracks 17 are normally of half-penny shapes 15 spreading away from the plastic zone 11 underneath the indent 13. Cracks have their maximum opening at the indent corners and the width gradually diminishes to zero at the tip. FIG. 2 shows the scanning electron micrographs of the surface of an as-indented SiC—$B_4C$ sample.

Oxidative experiments were conducted in a vertical tube furnace with platinum heating elements. Specimens were hung inside an enclosed quartz tube in baskets made of platinum wire. The atmosphere in the quartz tube was controlled. In the case of oxidation under dry environment, 100 cc/min of oxygen was passed through the specimen chamber. For oxidation under $H_2O$-containing environment, 0.33 ml/min of purified deionized water (equivalent to 450 cc/min water vapor at 25° C.) was pumped into an evaporator and the generated water vapor was then mixed with 50 cc/min oxygen to create an environment of about 90% $H_2O$-10% $O_2$. Oxidized samples were characterized by optical and scanning electron microscopy (SEM) to determine the extent of crack sealing, and energy dispersive X-ray (EDX) analysis for elemental information. The mass change of samples before and after the oxidation were also monitored in some experiments to evaluate the amount of oxidation product.

Example 1

Crack Sealing under Dry Oxidative Environments

Sintered samples of silicon carbide with different concentrations of $B_4C$, varying from B/Si=0.015 to 0.34, were used for the study of the minimum additives in terms of B/Si atomic ratio required to achieve crack sealing in silicon carbide matrices. It was found that crack sealing occurs at a B/Si ratio as low as 0.05. To compare with the crack sealing capability of $B_4C$ in dry oxidizing environments, a variety of different boride additions were examined. Complete crack sealing similar to that by $B_4C$ was achieved with all boron-containing additives in dry oxidizing environments. However, because $B_4C$ has low density and good chemical compatibility with silicon carbide and does not introduce extra elements in the system, it is a possible choice for crack sealing in dry oxidative environments.

Silicon carbide plus $B_4C$ or $TiB_2$ samples were also prepared by silicon melt infiltration. It was demonstrated that melt infiltrated $SiC/B_4C$ and $SiC/TiB_2$ materials all have crack sealing capability in the dry oxidizing environment. Further tests were done on samples of $SiC/B_4C$ and $SiC/TiB_2$ to study the effects of time and temperature on crack sealing in dry oxidizing environments.

It was shown that effective sealing is obtained under practically all conditions studied with complete sealing of about 1 $\mu$m wide cracks in times as low as 4 hours at temperatures of 800° C. and higher. At lower temperatures of 600° C. and 700° C., the sealing was also observed but only cracks several tenths of a micron were sealed.

Example 2

Figure 3:
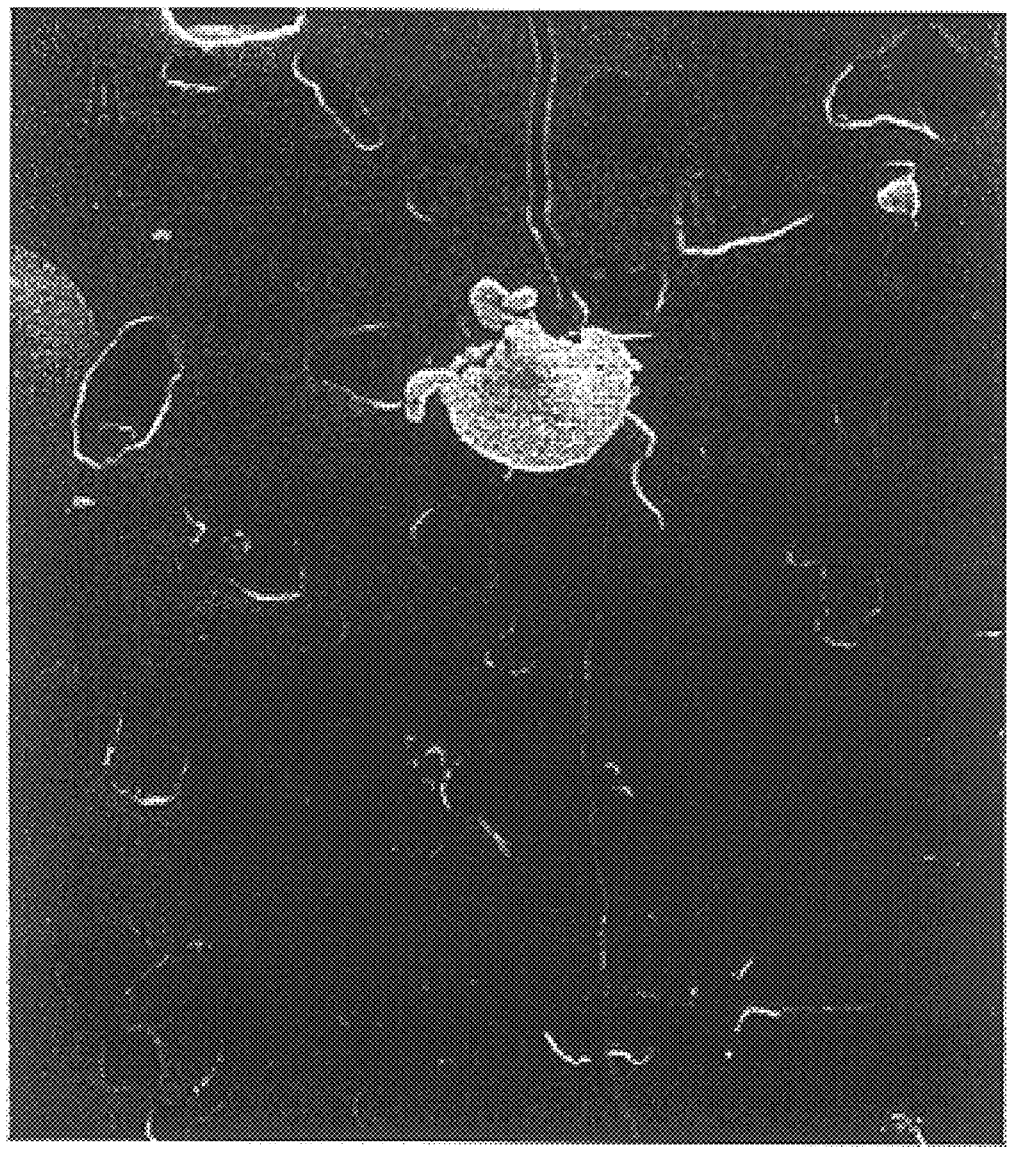
FIG. 3 is SEM micrographs of the surface of a sintered SiC/$B_4C$ sample (B/Si=0.25), subjected to oxidation at 900° C. in flowing 90% $H_2O$-10% $O_2$ for 24 hours. Little or no crack sealings are observed.

Crack Sealing under $H_2O$ Vapor-Containing Oxidative Environments in Sintered Silicon Carbide Composites Sintered $SiC/B_4C$ samples were tested in a water vapor-containing environment, about 90% $H_2O$-10% $O_2$. The cracks in the sintered $SiC/B_4C$ samples were not sealed. FIG. 3 shows that after treatment at about 900° C. for about 24 hours under about 90% $H_2O$-10% $O_2$, sealing did not occur. Most of the cracks remained unsealed. $B_4C$ as a boron-containing compound in sintered silicon carbide composites does not provide an adequate crack sealing capability in sintered $SiC/B_4C$ materials under high steam environments, such as the 90% $H_2O$-10% $O_2$ environment.

Example 3

Crack Sealing Behavior of Silicon Melt Infiltrated Silicon-Silicon Carbide Composites under $H_2O$ Vapor-Containing Oxidative Environments.

Figure 4A:
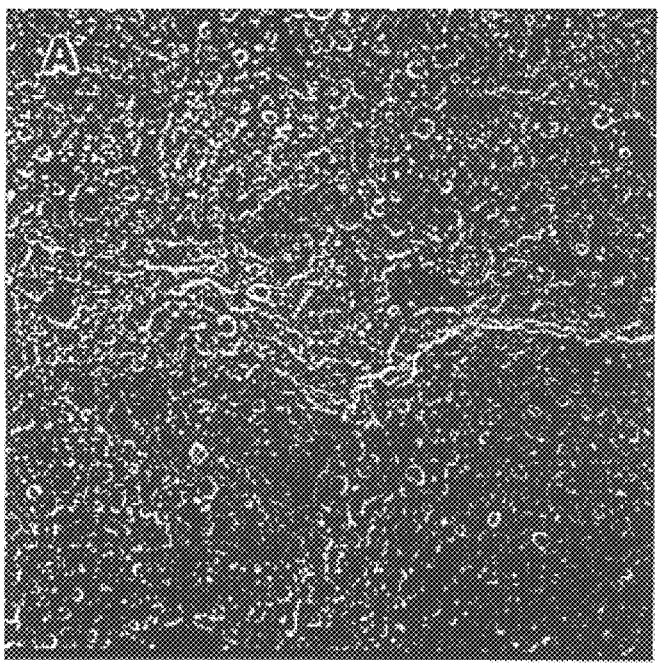
FIG. 4a, with lower additive content than the sintered sample has more oxidation product left on the surface and shows complete sealing such that the original indentation mark (diagonal) cannot be seen. On the other hand, little or no crack sealing is observed on the sintered sample and the cracks and indentation mark can be clearly seen.
Figure 4B:
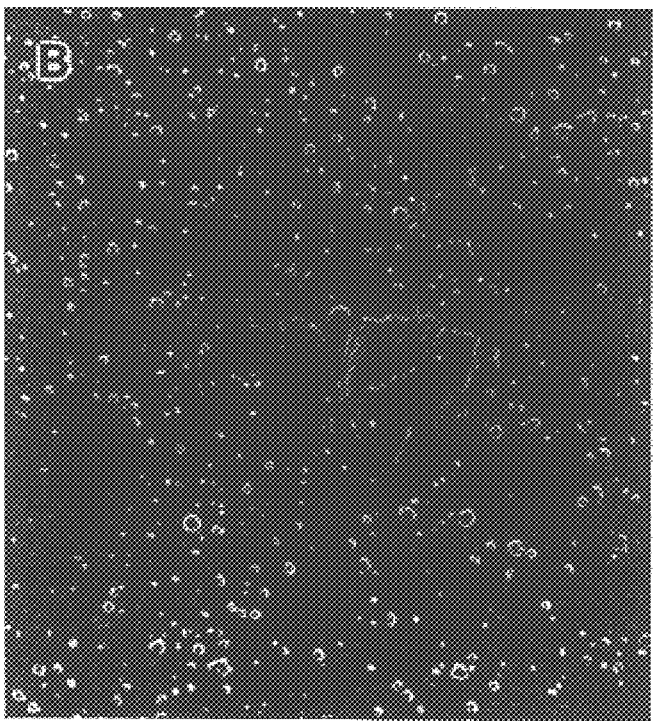
FIG. 4 is SEM micrographs showing the surfaces of (4a) a silicon melt infiltrated SiC/$B_4C$ sample (B/Si=0.18) and (4b) a sintered SiC/$B_4C$ sample (B/Si=0.25), both subjected to oxidation at 900° C. in flowing 90% $H_2O$-10% $O_2$ for 24 hours.

When samples made by silicon melt infiltration of preforms consisting of silicon carbide and boron carbide particles were subjected to the water vapor-containing environments, these samples exhibited superior crack sealing behavior compared to the sintered and hot pressed samples with $TiB_2$. FIG. 4 shows a melt infiltrated $SiC/B_4C$ sample. The improved crack sealing capability of boron carbide in silicon melt infiltrated samples may be due to the fact that boron carbide is partially dissolved in the silicon melt and distributed more uniformly in the matrix. The formation of $B_2O_3$ promotes the oxidation of silicon carbide as the oxygen diffusivity is much higher in $B_2O_3$ or $SiO_2$—$B_2O_3$ phases than in pure silicon oxide. Since in melt infiltrated samples the boron-containing compounds are mixed with silicon and silicon carbide in a much finer scale, the $SiO_2$—$B_2O_3$ oxidation product is more uniformly distributed, providing better and continuous sealing.

Figure 5:
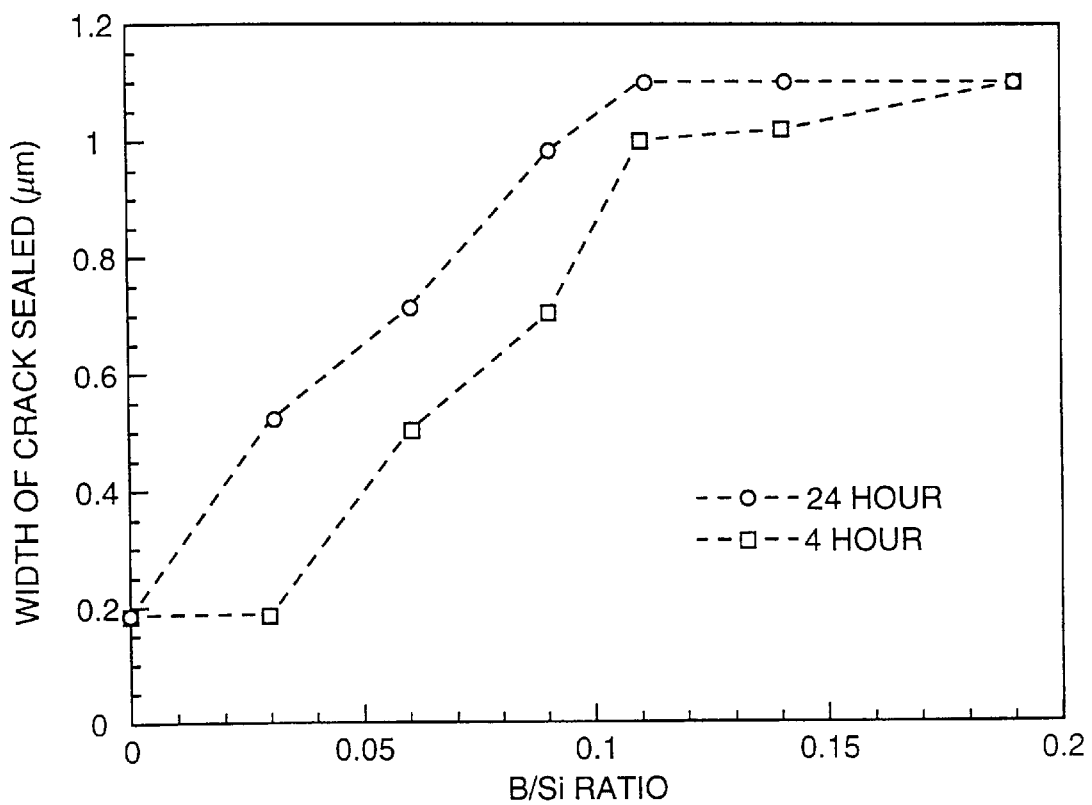
FIG. 5 is a graph showing the width of a crack sealed as a function of B/Si ratio in the silicon melt infiltrated materials oxidized in 90% $H_2O$-10% $O_2$ for 24 hours and 4 hours.

FIG. 5 is a graph showing the width of a crack sealed as a function of B/Si ratio in the silicon melt infiltrated materials oxidized in about 90% $H_2O$-10% $O_2$ at about 900° C. for about 24 hours and about 4 hours. The results in FIG. 5 show that the crack width sealed increases with time and B/Si ratio. The B/Si ratio is important, and a B/Si ratio over about 0.11 is particularly useful at 900° C. The critical B/Si ratio may be a function of the water vapor content, gas velocities, and temperature. It is also possible that a higher value of the B/Si ratio may be required at lower temperatures where the sealing will take longer. Therefore, it is recommended that for effective crack sealing, the B/Si ratio in silicon melt infiltrated composites be over about 0.11 and preferably over about 0.15.

Figure 6:
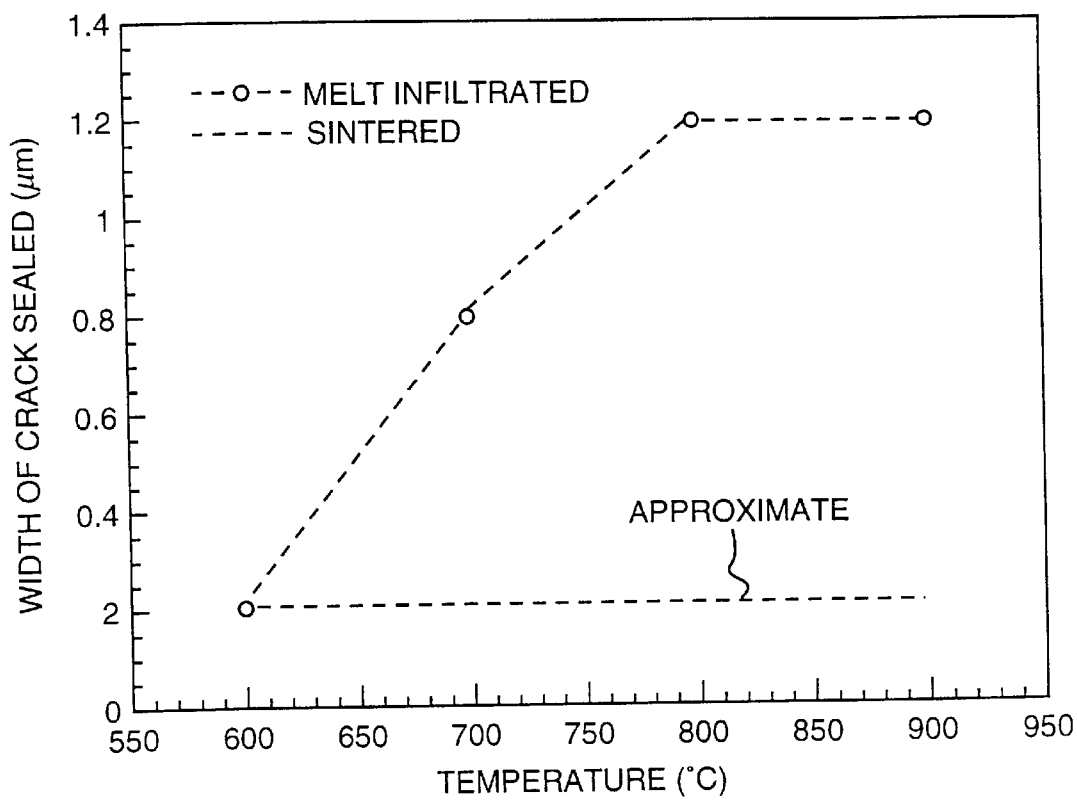
FIG. 6 is a graph showing the difference in composition between samples with $B_4C$ addition by silicon melt infiltration and by sintering.

FIG. 6 shows a comparison between silicon carbide composite samples with boron carbide, made by silicon melt infiltration (B/Si=0.18) and sintering (B/Si=0.25), oxidized in water vapor-containing environments for 24 hours at different temperatures. While the sintered sample barely showed any crack sealing after 24 hours at 900° C., the melt infiltrated sample was able to seal cracks of greater than 1.2 micrometers width at 800° C. in 24 hours. The small sealing (about 0.2 μm) shown in FIG. 6 for sintered samples represents our lowest limit to predict crack sealing and may actually be crack sealing caused by high temperature exposure rather than crack sealing by oxidation.

What is claimed:

1. The method for in situ sealing of cracks in silicon carbide-silicon matrix compositions containing coated fibers, carbon particles, silicon carbide particles, or mixtures of carbon and silicon carbide particles and at least one boron contain material, the atomic ratio of boron atoms to silicon atoms in said matrix being between about 0.05 and about 0.40, which comprises infiltrating a preform of said composition with molten silicon.

2. The method according to claim 1 where said boron-containing material is elemental boron, a boron carbide or a boron silicide or mixtures thereof.

3. The method according to claim 2 where said boron-containing material is selected from the group consisting of boron carbide, titanium borides, zirconium borides, aluminum borides, calcium borides, boron suicides, and mixtures thereof.

4. The method according to claim 3 where said boron-containing material is boron carbide.

5. The method according to claim 1 where said preform has fiberous material.

6. The method according to claim 5 where said fibrous material has at least a first outer coating covering substantially all of a surface of the fibrous material.

7. The method according to claim 6 where said first outer coating is selected from the group consisting of nitrides, borides, carbides, oxides, silicides and mixtures thereof.

8. method according to claim 7 where said first coating comprises boron nitride.

9. The method according to claim 8 where said fibrous material also contains a coating of silicon carbide or silicon nitride.

10. The method according to claim 6 where said fibrous material has a second coating on said first coating.

11. The method according to claim 5 where said fibrous material is a silicon carbide-containing fiber.

12. The method according to claim 1 where said molten infiltrant comprises silicon with dissolved boron.

13. The method according to claim 1 where said boron-containing material subsequently oxidizes at a crack surface to provide a glass sealant in said crack in a dry or water-containing environment.

* * * * *